United States Patent [19]
Lin

[11] 3,893,012
[45] July 1, 1975

[54] STEPPING MOTOR DRIVE CIRCUIT
[75] Inventor: Frank W. Lin, San Jose, Calif.
[73] Assignee: Qume Corporation, Hayward, Calif.
[22] Filed: July 5, 1974
[21] Appl. No.: 486,150

[52] U.S. Cl.................................. 318/696; 318/442
[51] Int. Cl.²......................................... H02k 37/00
[58] Field of Search.......... 318/138, 685, 696, 440, 318/442; 307/80, 81, 85

[56] References Cited
UNITED STATES PATENTS

| | | | |
|---|---|---|---|
| 3,626,269 | 12/1971 | Stanley | 318/696 |
| 3,662,245 | 5/1972 | Newell | 318/696 |
| 3,746,959 | 7/1973 | Kobayashi et al. | 318/696 |
| 3,757,193 | 9/1973 | Inaba et al. | 318/696 |
| 3,824,440 | 7/1964 | McIntosh | 318/696 |

*Primary Examiner*—G. Z. Rubinson
*Attorney, Agent, or Firm*—Townsend and Townsend; Warren P. Kujawa

[57] ABSTRACT

A drive circuit for providing high level driving current to the stator coils of a stepping motor during stepping operation and low level holding current to the stator coils during motor detent. The drive circuit comprises a plurality of individual circuits corresponding in number to the number of coils, each circuit including means for supplying high level current through the associated coil in either direction in response to the appearance of a first control signal and for supplying low level current through the associated coil in either direction when the control signal is absent. The direction of current flow in each coil is specified by a different pair of control signals. Each circuit includes means for enabling adjustment of the low level detent current so that the detent torque can be tailored to a given application.

10 Claims, 5 Drawing Figures

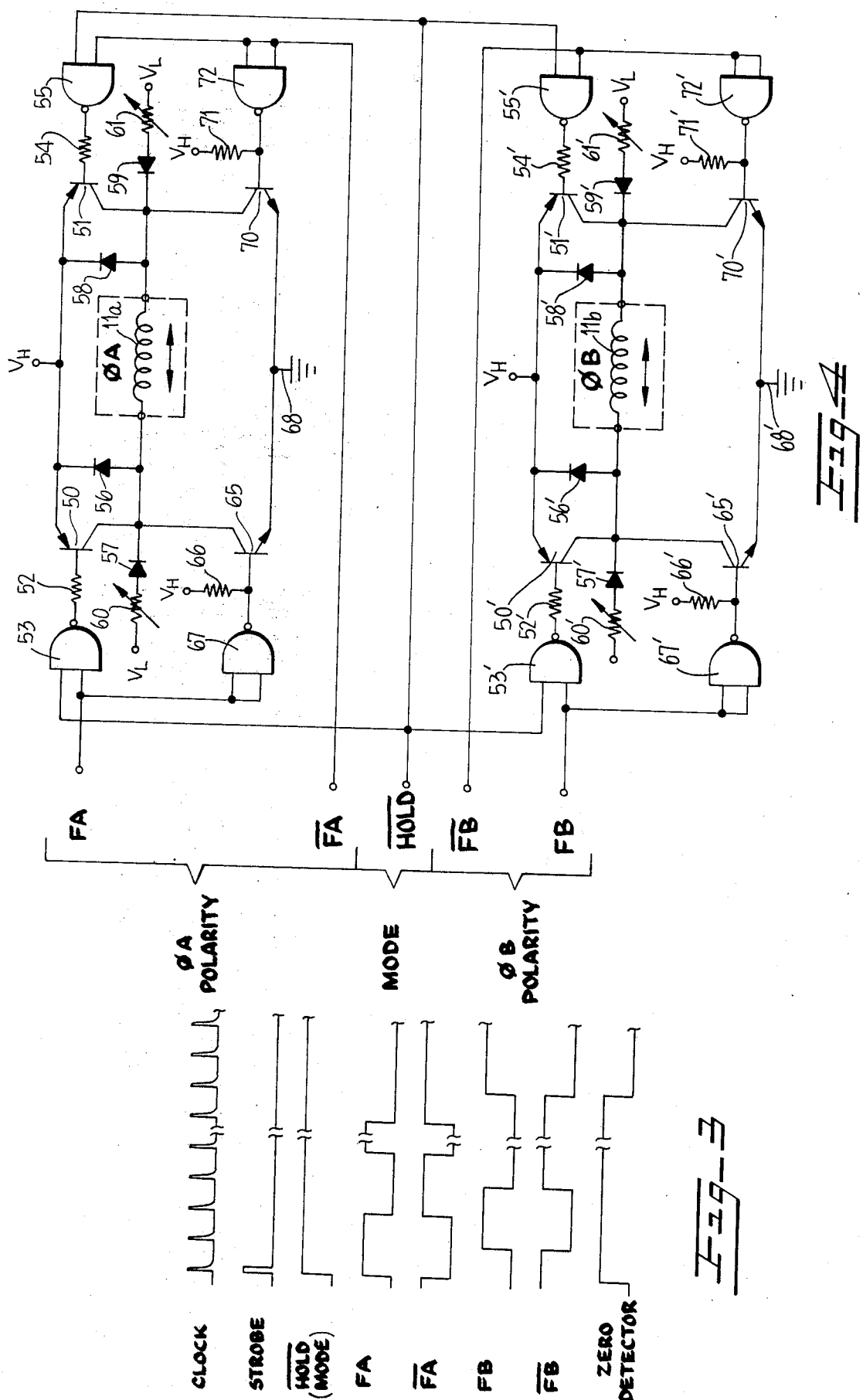

STEPPING MOTOR DRIVE CIRCUIT

BACKGROUND OF THE INVENTION

This invention relates to electronic circuitry for supplying current to the coils of an electrical motor. More particularly, this invention relates to a drive circuit for supplying current to the coils of a multi-phase stepping motor.

Electrical stepping motors are known which are used to provide incremental rotary motion to a wide variety of electro mechanical devices, such as chart drives, tape drives, ink ribbon cartridges, analog-to-digital converters, stepping servos, remote positioning devices, impulse counters and the like.

A typical electrical stepping motor comprises a rotor and a stator. The stator comprises an annular assembly of laminated layers fabricated from a magnetizable material and having a plurality of equi-angularly spaced radially inwardly directed teeth or poles, and a plurality of coil windings for generating a magnetic flux in the layers when a current of proper polarity is supplied to the coil windings. The number of windings is dependent on the design choice: thus, a two-phase motor is provided with two sets of coil windings; a three-phase motor is provided with three sets of windings, etc.

The rotor comprises a shaft having a plurality of rotor sections secured thereto spaced along the axis, the number of sections being an integral multiple of the number of phases of the motor. Each rotor comprises an annular member having a plurality of radially outwardly directed equi-angularly spaced teeth or poles associated in number to the number of stator poles. The rotor sections are mounted on the shaft with the poles of adjacent sections angularly displaced by a predetermined angle. The rotor sections are constructed from a permanent magnet, which provides a uni-directional field; or alternatively, from a magnetizable material. In the latter type of construction, a field coil is provided for generating the uni-directional magnetic field.

The stepping motor is operated by supplying current to the multi-phase stator windings in a predetermined sequential manner in order to provide magnetic force fields which interact with the uni-directional field in such a manner as to incrementally rotate the rotor. For example, in a two-phase motor, current of a given magnitude is supplied to the two-phase windings in four possible ways: viz. current in a first direction through both windings, current in a second direction through both windings, and current in opposite directions through both sets of windings. By properly phasing the direction of the current through the coils, the rotor is rotated in equi-angular stepped amounts, with the stepping angle dependent upon the number of rotor and stator teeth.

In addition to providing incremental stepping motion, it is frequently desirable to include a holding circuit to maintain the rotor in a fixed position after the rotor has been stepped. This detent feature is normally provided by maintaining the current flow through the multi-phase windings in a fixed configuration after the rotor has been stepped to the desired angular position. Known techniques for providing detent suffer from the limitation that relatively large quantities of power are consumed during the detent portion of the motor cycle which are in excess of the actual amount of detent torque required for a given application. Further, prolonged operation of the stepping motor in the detent mode frequently leads to premature failure of the coil windings due to the excessive amount of heat generated in this mode.

SUMMARY OF THE INVENTION

The invention comprises a stepping motor drive circuit which provides a high level driving current to the stator windings when the motor is operated in the stepping mode and which provides a low level of holding current when the motor is operated in the detent mode. In the preferred embodiment, a plurality of individual driving circuits corresponding in number to the number of phase windings of the motor are each coupled to a different one of the windings. Each circuit includes means for providing high level current through the associated stator windings in either direction in response to the appearance of a first control signal and means for providing a low level current in either direction through the associated stator windings in response to the absence of the control signal. The direction of current flow in each phase winding is specified by a pair of control signals which may be either synchronously related, i.e., the complementary outputs of a bi-stable element, or asynchronously related, i.e., the output of individually controlled independent bi-stable elements in order to enable full step or half-step operation of the associated motor. Each circuit also includes means for enabling adjustment of the low level detent current so that the detent torque can be tailored to a given application.

For a fuller understanding of the nature and advantages of the invention, reference should be had to the ensuing detailed description taken in conjunction with the accompanying drawings.

BRIEF DESCRIPTION OF THE DRAWINGS

FIG. 3 is a waveform diagram illustrating the operation of the FIG. 2 circuit;

FIG. 4 is a circuit diagram of the preferred embodiment for driving a two-phase stepping motor.

DESCRIPTION OF THE PREFERRED EMBODIMENTS

Figure 1:
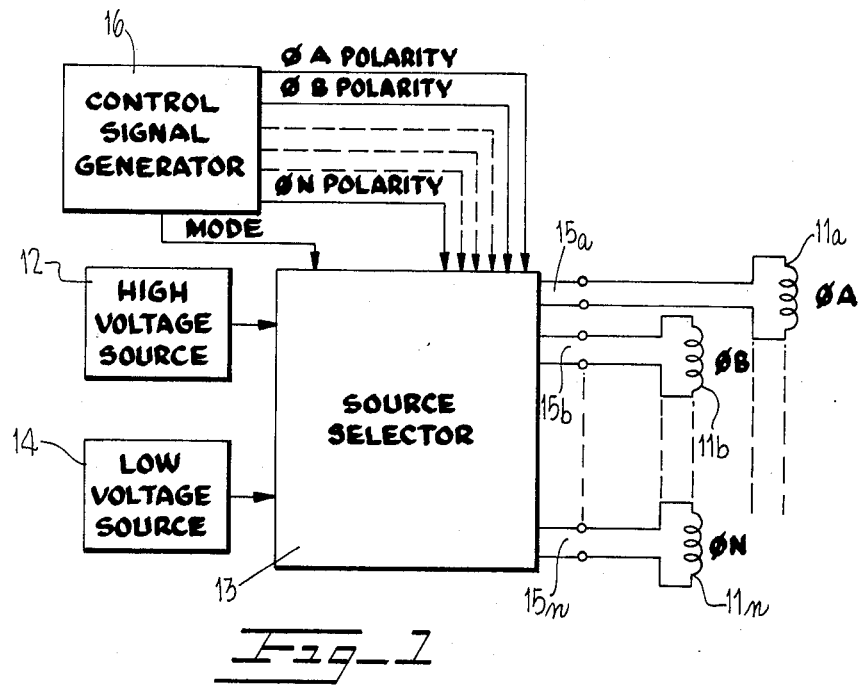
FIG. 1 is a block diagram of the invention.

Turning now to the drawings, FIG. 1 illustrates a block diagram of the invention suitable for driving a stepping motor having a plurality of phase windings $11_a, 11_b, \ldots, 11_n$. A high voltage source 12, which may comprise any suitable source of DC voltage, is coupled to a first voltage input of a source selector 13, the preferred embodiment of which is illustrated in FIG. 4. A conventional low voltage source 14 is coupled to a second voltage input of source selector 13. Source selector 13 is provided with a plurality of pairs of output terminals $15_a, 15_b, \ldots, 15_n$ corresponding in number to the number of phase windings $11_i$ of the associated stepping motor. A control signal generator 16 provides a plurality of control signals labeled $\phi A$ POLARITY, $\phi B$ POLARITY, $\ldots$, $\phi N$ POLARITY, which are coupled to a plurality of control signal inputs of source selector 13. Control signal generator 16 also generates a MODE control signal which is coupled to another control signal input to source selector 13.

In operation, source selector 13 couples the voltage from either source 12 or source 14 to different ones of the phase windings $11_i$ via output terminal pairs $15_i$. The magnitude of the output voltage on terminal pairs $15_i$, i.e., the choice of source 12 or 14, is controlled by MODE signal supplied by control signal generator 16. The direction of current flow through the individual phase windings $11_i$ is determined by the $\phi$ POLARITY control signals supplied by control signal generator 16.

Figure 2:
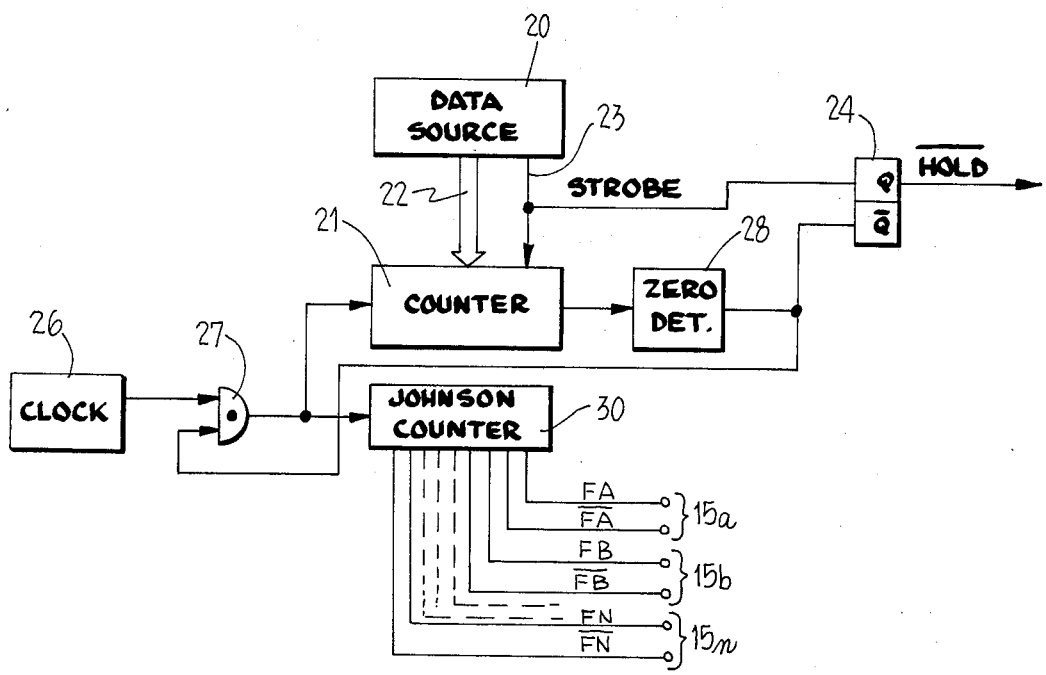
FIG. 2 is a circuit diagram of the control signal generator of FIG. 1.

Control signal generator 16 may comprise any one of a number of known devices for generating the above noted control signals, depending on the requirements of a particular application. FIG. 2 shows a preferred embodiment of control signal generator 16 suitable for use in driving a stepping motor used in an ink ribbon cartridge drive mechanism, such as that disclosed in U.S. patent application Ser. No. 448,848 filed Mar. 7, 1974, or a stepping motor used in a paper feed mechanism, such as that disclosed in U.S. patent application Ser. No. 448,870 filed Mar. 7, 1974. As seen in this fig., a multi bit character specifying the desired number of angular steps by which the motor rotor is to be rotated is coupled from a suitable data source 20, such as the output buffer register of a digital computer to a counter/register 21 via a data bus 22. Counter/register 21 may comprise any one of a number of conventional commercially available devices capable of accepting a multi-bit character input in response to the appearance of a strobe signal on a strobe line 23 and having a clock input whereby the counter may be incremented or decremented to zero by a suitable clock signal train.

The strobe input lead 23 is also coupled to the set input of MODE flip flop 24, the Q output of which is designated $\overline{HOLD}$.

The clock input of counter/register 21 is coupled to the output of a conventional clock signal generator 26 via an AND gate 27. The output of counter 21 is coupled to the input of a conventional zero detector 28, the output of which is coupled to the reset input of MODE flip flop 24 and also to the enabling input of AND gate 27. The output of clock generator 26 is also coupled via an AND gate 27 to the input of a conventional Johnson counter 30 having a plurality of pairs of output terminals labled FA, $\overline{FA}$; FB, $\overline{FB}$; . . . ; FN, $\overline{FN}$; all corresponding to terminals to 15a, 15b, . . . 15n of FIG. 1. As will be evident to those skilled in the art, Johnson counter 30 has N flip flops configured in pairs for generating a plurality of complementary pairs of rectangular wave signal trains with each pair of signal trains being phase displaced from the remaining pairs of signal trains by a pre-determined amount such as 90°. With reference to FIG. 3, for example, two such pairs of control signal trains FA, $\overline{FA}$; FB, $\overline{FB}$ are shown, with FB phase displaced 90° from FA and $\overline{FB}$ phase displaced 90° from $\overline{FA}$.

In operation, in response to the appearance of a strobe signal on conductor 23, a multi-bit character is transferred from data source 20 via data bus 22 to counter/register 21, and MODE flip flop 24 is set, thereby establishing $\overline{HOLD}$ true. When the multi-bit character is placed into counter/register 21, the output of zero detector 28 changes state, thereby enabling AND gate 27. With AND gate 27 enabled, the clock signal train from clock 26 is coupled to the incrementing input of counter/register 21, and also to the input of the Johnson counter 30, thereby initiating the generation of control signal trains FA, $\overline{FA}$, FB, $\overline{FB}$, etc. Concurrently with the generation with these control signals, counter 21 is incremented or decremented until the zero state is reached. Upon the occurrence of this event, the output of zero detector 28 changes state, thereby re-setting MODE control flip flop 24 and disabling AND gate 27. The operational sequence is re-instituted upon generation of a subsequent strobe signal and the storage of a new multi-bit character in counter/register 21.

FIG. 4 is a circuit diagram of a preferred embodiment of source selector 13 specifically designed for use in a two-phase permanent magnet stepping motor. As seen in this Figure, source selector 13 comprises an upper portion generally designated by reference numeral 40 for supplying current to a first set of stator windings $11_a$, and a lower portion 42 for supplying current to a second set of stator windings $11_b$. For convenience, the first and second set of windings are hereinafter designated as the phase A and phase B windings, respectively.

Upper portion 40 of source selector 13 includes a first pair of transistors 50, 51 of a first conductivity type each having an emitter coupled to high voltage source 13 designated as $V_H$, which in the preferred embodiment is a conventional 15 VDC source. The base of first transistor 50 is coupled via a resistance 52 to the output of an inverting AND gate 53. The base of transistor 51 is coupled via a resistance 54 to the output of an inverting AND gate 55. Inverting AND gates $\overline{53, 55}$ are controlled by control signals FA, $\overline{FA}$ and $\overline{HOLD}$ described more fully below.

The collector of transistor 50 is coupled to a first end of phase A winding $11_a$, to the anode of a quenching diode 56 and to the cathode of a diode 57. The collector of transistor 51 is coupled to the other end of phase A winding $11_a$ to the anode of a quenching diode 58 and to the cathode of a diode 59. The anode of diode 57 is coupled via a variable resistance 60 to low voltage source 14 designated as $V_1$, which in the preferred embodiment is a conventional 5 VDC source. The anode of diode 59 is likewise coupled to $V_1$ via a variable resistance 61.

The collector of transistor 50 is further coupled to the collector of a transistor 65 of opposite conductivity type. The base of transistor 70 is coupled to $V_H$ via a resistance 71 and also to the output of an inverting AND gate 72. The emitter of transistor 70 is coupled to reference potential 68.

The input to inverting AND gate 67 is FA control signal; the input to inverting AND gate 72 is $\overline{FA}$ control signal.

Lower portion 42 of source selector 13 is substantially identical to upper portion 40. Accordingly, the same reference numerals have been applied to the corresponding elements in portion 42 with the prime designation used to distinguish the elements of lower portion 42 from upper portion 40. Since the operation of both portions 40 and 42 are substantially identical, only the operation of upper portion 40 will be described in detail.

The state of transistor 50 is controlled by both FA, and $\overline{HOLD}$ control signals. The state of lower transistor 65 is controlled by FA control signal, while the state of lower transistor 70 is controlled by $\overline{FA}$ control signal. Whenever FA and $\overline{HOLD}$ are true, the output of inverting AND gate 53 is false which switches transistor 50 on, thereby enabling current to flow from $V_H$ through transistor 50 and phase A winding $11_a$ in the right-hand direction as viewed in the Fig. to the collector of transistor 70. If $\overline{FA}$ is false at the inputs to inverting AND gate 72, transistor 70 is switched on by $V_H$ and current flows therethrough to ground 68.

Similarly, when $\overline{FA}$ and $\overline{HOLD}$ are both true, the output of inverting AND gate 55 is false which switches transistor 51 on, thereby enabling current to flow from $V_H$ through transistor 51 and phase A winding $11_a$ in the left-hand direction as viewed in the Fig. to the collector of transistor 65. If FA is false at the inputs to inverting AND gate 67, transistor 65 is switched on by $V_H$ and current flows therethrough to ground 38.

In the absence of $\overline{HOLD}$ control signal (i.e., $\overline{HOLD}$ false) neither transistor 50 nor transistor 51 can be switched on. However, if FA is true, the output of inverting AND gate 67 is false thereby switching off transistor 65. $\overline{FA}$ false causes transistor 70 to be switched on, thereby providing a current path from low voltage supply source $V_1$, variable resistance 60, diode 57, through phase A winding $11_a$ in the right-hand direction, through transistor 70, to ground potential 68.

Similarly, with FA false and $\overline{FA}$ true, transistor 70 is switched off and transistor 65 is switched on, thereby providing a current path from $V_1$ through variable resistance 61, diode 59, through phase A winding $11_a$ in the left-hand direction and transistor 65 to ground potential 68.

Thus, in the absence of $\overline{HOLD}$ control signal (i.e., $\overline{HOLD}$ false), upper portion 40 is conditioned to provide current through phase A winding $11_a$ in one of two directions from low voltage $V_1$. The magnitude of this current may be adjusted by means of variable resistance 60 in the right-hand direction and variable resistance 61 in the left-hand direction. Thus, the amount of current $I_{da}$ required to provide the necessary detent for any given application may be selected in accordance with the requirements of that application by adjusting resistances 60, 61 and the current will be limited to that value during detent.

As noted above, the operation of lower portion 42 of the preferred embodiment is substantially identical to that described above for upper portion 40, with the control signals FB, $\overline{FB}$ replacing control signals FA, $\overline{FA}$. Similarly, variable resistances 60', 61' enable adjustment of detent current $I_{db}$ for phase B inductance $11_b$.

Figure 5:
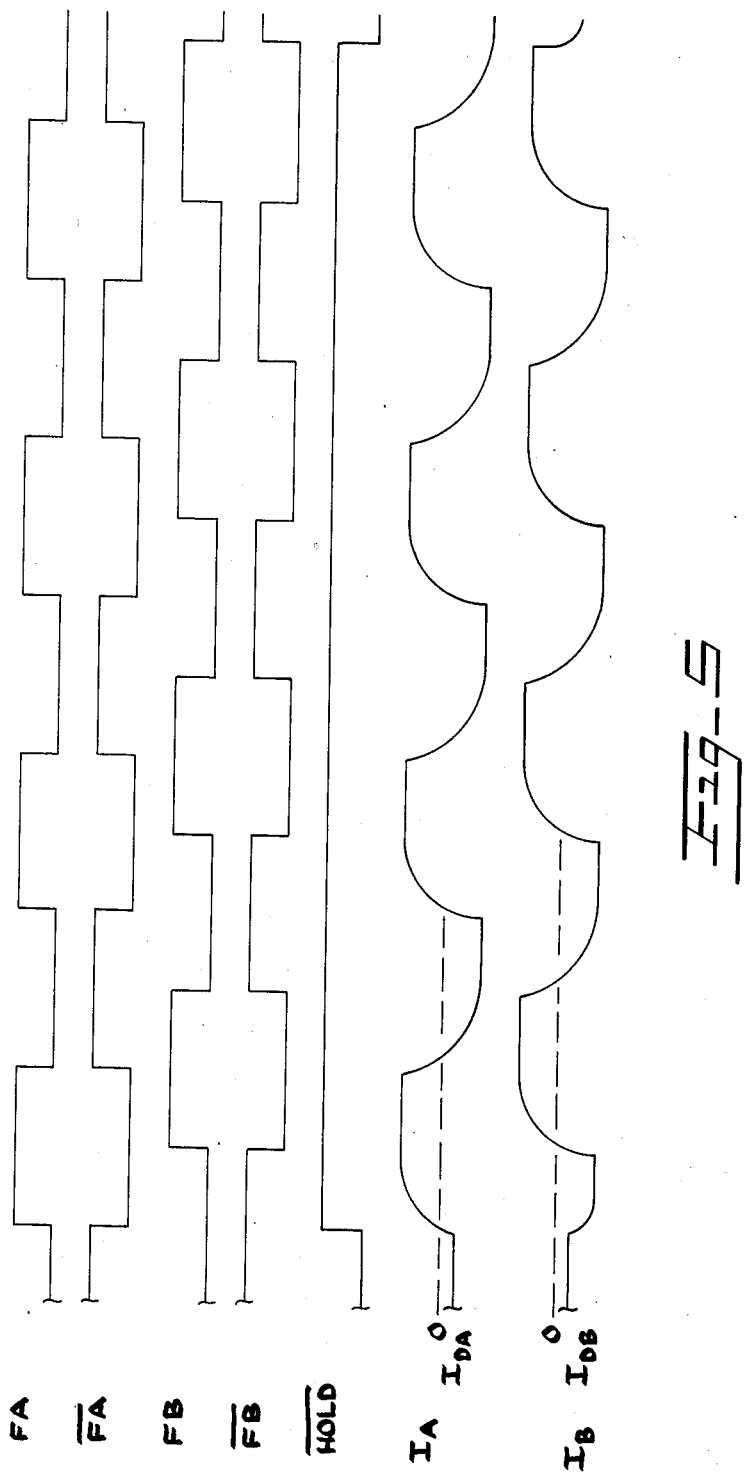
FIG. 5 is a waveform diagram illustrating the operation of the FIG. 4 circuit.

FIG. 5 illustrates the control signals used in association with source selector 13 as illustrated in FIG. 4. Control signals FA, $\overline{FA}$ are complementary rectangular periodic pulse trains, and control signals FB, $\overline{FB}$ are complementary rectangular periodic pulse trains which are displaced 90° from control signals FA, $\overline{FA}$. $\overline{HOLD}$ control signals is a bi-level signal which remains true for the entire duration of the stepping mode of operation. Waveforms $I_a$ and $I_b$ indicate the magnitude and direction of DC current through the phase A winding $11_a$ and phase B winding $11_b$, respectively. In FIG. 5, positive value is arbitrarily assigned to current flowing in the right-hand direction as viewed in FIG. 4.

During the detent mode of operation ($\overline{HOLD}$ false) the current through phase A and phase B windings $11_a$, $11_b$ is limited to the detent threshold values $I_{da}$ and $I_{db}$, respectively. During stepping mode of operation, ($\overline{HOLD}$ true) the direction of current flow through phase A and phase B windings $11_a$, $11_b$ is controlled by control signals FA, $\overline{FA}$; and FB, $\overline{FB}$, respectively. As is evident from the waveforms $I_a$ and $I_b$, the magnitude of the current flowing through windings $11_a$, $11_b$ during stepping mode of operation is substantially greater than the detent current $I_{da}$ and $I_{db}$ provided by low voltage source $V_1$ during detent mode of operation. This not only reduces the total power consumption of a stepping motor which is repetitively operated in alternate stepping and detent modes, but also increases the useful life of the phase windings $11_a$, $11_b$ over that heretofore attainable with conventional drive circuits.

When phase windings $11_a$, $11_b$ are operated with the control signals FA, $\overline{FA}$; FB, $\overline{FB}$, as depicted in FIG. 5, the motor is operated in the so-called full step mode of operation, i.e., a mode of operation in which current always flows through both phase winding $11_a$ and phase B winding $11_b$ throughout the stepping operation (four possible states). If desired, the motor may be operated in the half step mode, defined as one in which current flows through at least one winding at all times (eight possible states). This may be accomplished by appropriately re-phasing control signals FA, $\overline{FA}$; FB, $\overline{FB}$ in a manner known to those skilled in the art.

In addition, although the MODE control signal ($\overline{HOLD}$) is illustrated as a single step function which remains true throughout the stepping operation, in some applications it may be desirable to employ a signal which comprises a periodic pulse train consisting of a plurality of uniformly spaced pulses of substantially identical width in order to reduce the average current through windings $11_a$, $11_b$. This may be effected by using conventional circuitry for modifying the illustrated MODE control signal.

As will now be apparent, stepping motor drive circuits constructed in accordance with the teachings of the above described invention enable prolonged operation of conventional stepping motor circuits with reduced power consumption and increase useful lifetime of the stepping motor. In addition, the detent torque can be tailored to a given application by the expedient of a simple manual adjustment in the low current branches. Further, the symmetrical design of the invention permits low cost fabrication techniques to be employed in the construction of circuitry embodying the invention.

While the above provides a complete disclosure of the preferred embodiment of the invention, various modifications, alternate constructions, and equivalents may be employed without departing from the true spirit and scope of the invention. For example, while source selector 13 has been specifically disclosed with reference to a two-phase stepping motor, the principles of the invention may be readily adapted to other multi-phase stepping motors, e.g., three-phase, four-phase, etc. Therefore, the above description and illustrations should not be construed as limiting the scope of the invention, which is defined by the appended claims.

What is claimed is:

1. An apparatus for supplying a relatively high voltage and a relatively low voltage to a plurality of associated devices, said apparatus comprising the combination of:

a source of relatively high voltage;
a source of relatively low voltage;

a control signal generator for generating a mode control signal and a plurality of pairs of polarity control signals; and a source selector having a plurality of control signal input terminals individually coupled to different ones of control signals generated by said control signal generator, a pair of voltage input terminals respectively coupled to said source of relatively high voltage and said source of relatively low voltage, and a plurality of pairs of voltage output terminals for alternately coupling said high voltage source and said low voltage source to said plurality of pairs of voltage output terminals in response to the receipt of said mode control signal from said control signal generator, the polarity of the voltage present on said output voltage terminals being determined by said polarity control signals coupled to said source selector from said control signal generator.

2. The combination of claim 1 wherein said source selector comprises a plurality of individual drive circuits corresponding in number to said plurality of associated devices, each said drive circuit including first means for coupling said high voltage source to an associated one of said plurality of pairs of voltage output terminals when said mode control signal is at a first level and for coupling said low voltage source to said associated one of said plurality of pairs of voltage output terminals when said mode control signal is at a second level; and means responsive to said polarity control signals for controlling the polarity of said output voltage present on said one of said plurality of pairs of output voltage terminals.

3. The combination of claim 2 wherein said drive circuits each has a symmetric pair of substantially similar branches each including a pair of complementary conductivity type semiconductor devices having a common junction coupled to a different one of said associated pair of voltage output terminals, a first one of said pair of semiconductor devices having an element coupled to said high voltage input terminal and a switching element coupled to a first control gate having a pair of inputs coupled respectively to the mode control signal input terminal and one of an associate pair of said plurality of polarity control signal input terminals, and a uni-directional conducting device coupled between said low voltage input terminal and said output voltage terminal; the other one of said pair of semiconductor devices having a switching element coupled to said high voltage input terminal and a second control gate, said second control gate having at least one input terminal coupled to the other one of said associated pair of polarity control signal input terminals.

4. The combination of claim 3 wherein at least one of said drive circuits further includes means coupled between said low voltage input terminal and said uni-directional conducting device for enabling adjustment of the magnitude of the current flowing therethrough.

5. The combination of claim 1 wherein said associated devices comprise a plurality of phase windings of a stepping motor having a rotor.

6. A source selector for supplying a relatively high voltage and relatively low voltage of desired polarity to an associated device, said selector comprising:

a plurality of polarity control signal input terminals adapted to be coupled to a source of a plurality of pairs of polarity control signals;

a mode control signal input terminal adapted to be coupled to a source of a mode control signal;

a high voltage input terminal adapted to be coupled to a source of relatively high voltage;

a low voltage input terminal adapted to be coupled to a source of relatively low voltage;

a plurality of pairs of voltage output terminals for supplying selected sequential output voltages to said associated device;

means for alternately coupling said high voltage input terminal and said low voltage input terminal in selective manner to said plurality of pairs of voltage output terminals in accordance with the nature of the mode control signal present at said mode control signal input terminal; and means for controlling the polarity of the voltage present on said output voltage terminals in accordance with the nature of the polarity control signals present on the polarity control signal input terminals.

7. The combination of claim 6 wherein said source selector comprises a plurality of individual drive circuits corresponding in number to said plurality of pairs of voltage output terminals, each said drive circuit including first means for coupling said high voltage input terminal to an associate one of said plurality of pairs of voltage output terminals when said mode control signal is at a first level and for coupling said low voltage input terminal to said associated one of said plurality of pairs of voltage output terminals when said mode control signal is at a second level; and means responsive to said polarity control signals for controlling the polarity of the output voltage present on said one of said plurality of pairs of output voltage terminals.

8. The combination of claim 7 wherein said drive circuits each has a symmetric pair of substantially similar branches, each branch including a pair of complementary conductivity type semiconductor devices having a common junction coupled to a different one of said associated pair of voltage output terminals, a first one of said pair of semiconductor devices having an element coupled to said high voltage input terminal and a switching element coupled to a first control gate having a pair of inputs coupled respectively to said mode control signal input terminal and one of an associated pair of said plurality of polarity control signal input terminals, and a uni-directional conducting device coupled between said low voltage input terminal and said output voltage terminal, the other one of said pair of semiconductor devices having a switching element coupled to said high voltage input terminal and a second control gate, said second control gate having at least one input terminal coupled to the other one of said associated pair of polarity control signal input terminals.

9. The combination of claim 8 wherein at least one of said drive circuits further includes means coupled between said low voltage input terminal and said uni-directional conducting device for enabling adjustment of the magnitude of the current flowing therethrough.

10. The combination of claim 6 wherein said associated device comprises a stepping motor having a plurality of phase windings and a rotor.

* * * * *